US009322687B2

(12) United States Patent
Grothey et al.

(10) Patent No.: US 9,322,687 B2
(45) Date of Patent: Apr. 26, 2016

(54) MAGNETIC-INDUCTIVE FLOW METER

(71) Applicant: ABB TECHNOLOGY AG, Zürich (DE)

(72) Inventors: Harald Grothey, Göttingen (DE);
Holger Seebode, Göttingen (DE);
Markus Brode, Göttingen (DE)

(73) Assignee: ABB TECHNOLOGY AG, Zürich (CH)

( * ) Notice: Subject to any disclaimer, the term of this patent is extended or adjusted under 35 U.S.C. 154(b) by 0 days.

(21) Appl. No.: 14/455,978

(22) Filed: Aug. 11, 2014

(65) Prior Publication Data

US 2015/0040683 A1 Feb. 12, 2015

(30) Foreign Application Priority Data

Aug. 9, 2013 (DE) ............. 20 2013 007 140 U

(51) Int. Cl.
*G01F 1/56* (2006.01)
*G01F 1/58* (2006.01)
(52) U.S. Cl.
CPC ........... *G01F 1/584* (2013.01); *G01F 1/58* (2013.01); *G01F 1/588* (2013.01)
(58) Field of Classification Search
CPC .............. G01F 1/56; G01F 1/58; G01F 1/60
USPC ............ 73/861.11–861.13, 861.08, 861.16
See application file for complete search history.

(56) References Cited

U.S. PATENT DOCUMENTS 3,763,426 A * 10/1973 Wilkes ............... G01R 31/022
324/515
4,205,212 A * 5/1980 Ullmann ............... B23H 7/10
219/69.12
5,090,250 A 2/1992 Wada
5,199,162 A * 4/1993 Groos ................. B23H 7/10
29/825
5,388,579 A * 2/1995 Dowd ................ A61B 5/0448
439/909
5,448,920 A 9/1995 Ketelsen et al.
(Continued)

FOREIGN PATENT DOCUMENTS

DE 1162587 B 6/1964
DE 41 00 987 A1 7/1992
(Continued)

OTHER PUBLICATIONS

European Search Report dated Sep. 22, 2014, issued by the European Patent Office in the corresponding European Application No. 14002694.9. (6 pages).

*Primary Examiner* — Jewel V Thompson
(74) *Attorney, Agent, or Firm* — Buchanan Ingersoll & Rooney PC

(57) ABSTRACT

The present disclosure relates to a magnetic-inductive flow meter having a measuring tube on which there is fitted a magnetic unit for generating a magnetic field, which is aligned substantially perpendicular to a flow direction of an electrically conductive measuring medium flowing through the measuring tube and whose measurement voltage induced in the measuring medium can be detected by at least two inserted measuring electrodes electrically insulated from the measuring tube. In order to avoid coupling interference voltages into the electrical electrodes, the first and the second electrode leads can be jointly twisted starting from the leadthrough as far as the first electrode, where the first electrode lead is electrically connected to the first electrode, and the second electrode is connected to a short-circuited conductor loop which encompasses the measuring tube and is connected to the second electrode lead at a location of the first electrode.

6 Claims, 1 Drawing Sheet

(56) References Cited

U.S. PATENT DOCUMENTS

| | | | |
|---|---|---|---|
| 5,671,736 A * | 9/1997 | Pettit | A61B 5/4362 600/376 |
| 6,060,699 A * | 5/2000 | Sakurai | F01N 3/2013 219/205 |
| 6,260,420 B1 | 7/2001 | Ketelsen et al. | |
| 2014/0178726 A1 * | 6/2014 | Kwon | H01M 10/04 429/94 |
| 2015/0143899 A1 * | 5/2015 | Yamamoto | G01F 23/24 73/304 R |

FOREIGN PATENT DOCUMENTS

| | | |
|---|---|---|
| DE | 195 35 997 A1 | 4/1997 |
| DE | 196 53 184 A1 | 7/1998 |
| DE | 102 44 646 A1 | 4/2004 |
| DE | 10 2004 053 065 A1 | 5/2006 |
| DE | 10 2007 032 879 A1 | 1/2009 |
| EP | 0 416 866 A1 | 3/1991 |

* cited by examiner

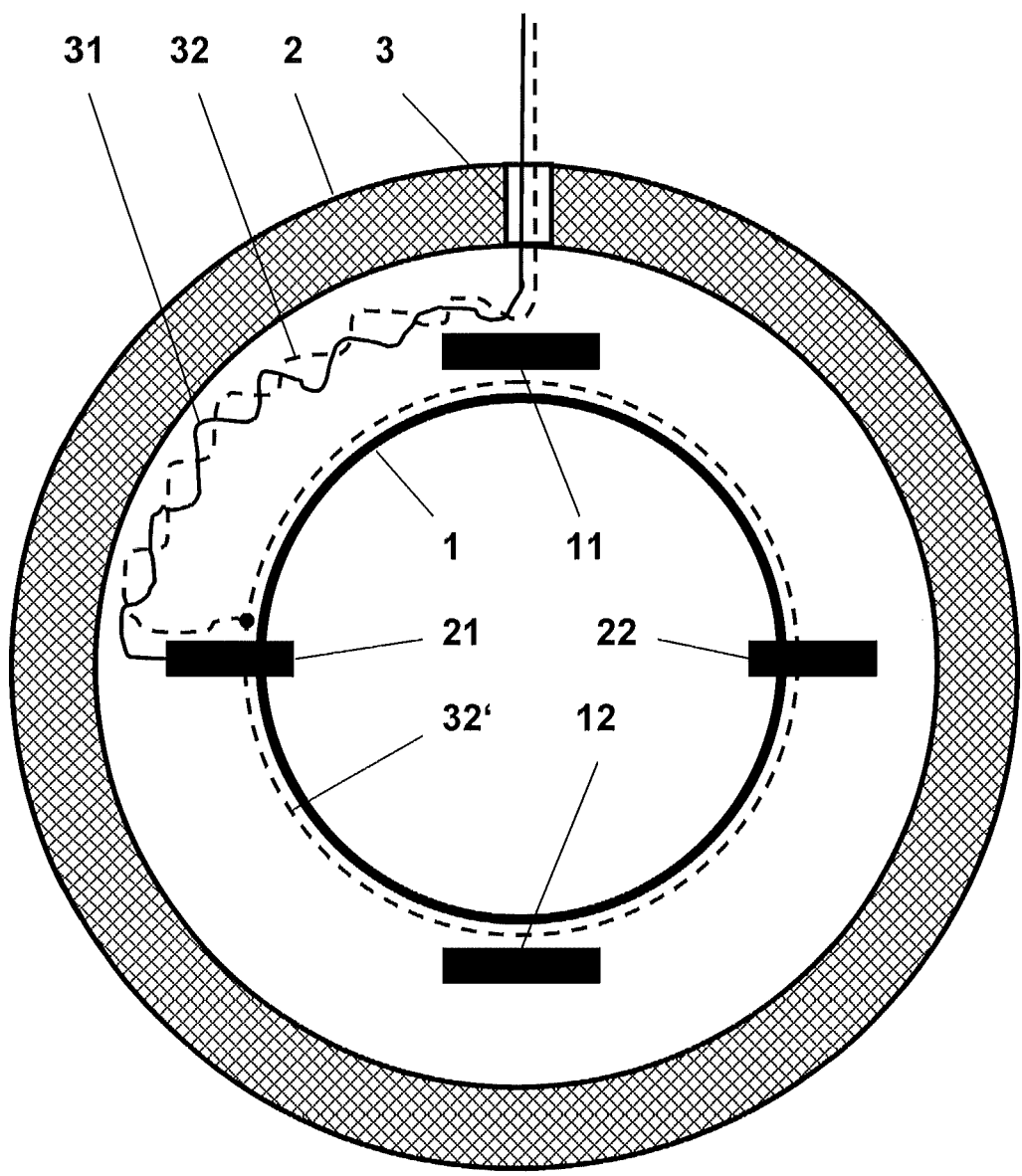

MAGNETIC-INDUCTIVE FLOW METER

RELATED APPLICATION(S)

This application claims priority to German Application 202013007140.0 filed in Germany on Aug. 9, 2013. The entire contents of this application is hereby incorporated by reference in its entirety.

FIELD

The field of use of the present disclosure extends to process technology such as to applications in the chemical industry, pharmaceutics and the cosmetics industry, municipal water and wastewater industry, the food industry and the like. For example, use can be made in these technical fields of generic flow meters for determining a volume flow or mass flow of liquids, slurries and pastes which must have a specific minimum electrical conductivity as a prerequisite for application of the magnetic-inductive measuring principle.

BACKGROUND INFORMATION

Magnetic-inductive flow meters are distinguished by very accurate measurement results, no pressure loss being caused in the piping system by the measurement. Moreover, magnetic-inductive flow meters have no components that move or project into the measuring tube and which, for example, would be subject to wear by measuring medium flowing past.

The measuring principle that is used in exemplary embodiments disclosed herein is based on Faraday's law of induction which states that a voltage is induced in a conductor moving in a magnetic field. When this law of nature is employed in metrology, the electrically conductive measuring medium flows through a measuring tube in which a magnetic field is generated perpendicular to the flow direction. The voltage induced in the measuring medium is tapped by an electrode arrangement. It is possible therefrom to determine the volume flow of the measuring medium—or by taking account of the density—the mass flow thereof, since the measurement voltage thus obtained is proportional to the mean flow rate of the flowing measuring medium.

A generic magnetic-inductive flow meter is known from DE 2004 053 065 A1. The flow meter substantially includes a measuring tube made from metal through which measuring medium flows and on which there is externally arranged a magnetic unit for generating a magnetic field perpendicular to a flow direction of the measuring medium. A pair of measuring electrodes penetrating the wall of the measuring tube in an opposed fashion is provided in the vicinity of the magnetic unit. The measuring medium flowing through the measuring tube is to be electrically insulated from the measuring tube which can consist of metal in order for the magnetic-inductive measuring principle to function. Since the measuring tube can be integrated in a pipeline, electrical grounding is carried out in this situation. In order to insulate the measuring tube electrically, the inside wall thereof is therefore coated with an elastic plastic. In many cases, a so-called liner is inserted into the measuring tube and forms a thin-walled elastic coating which can be resistant to corrosion by the measuring medium. The measuring tube is integrated in the further extent of the pipeline via double-sided flange sections.

The flow signal formed is measured at the electrodes in contact with measuring medium. Unipartite or multipartite electrodes for flow measuring devices are known to this end. It is possible to use appropriate materials as regards a desired suitability for abrasive media, as well.

DE 196 53 184 A1 discloses a signal processing circuit for such a flow measuring device which reveals a position of the magnetic and electrical electrodes.

It is known from DE 10 2007 032 879 A1 to guide electrical connecting lines between electrodes, and to guide means for processing measured values through a common leadthrough in a lining of the measuring tube, and by a shortest route, to the electrodes. With such an arrangement, an area is defined which is limited approximately in a shape of a semicircle by the geometric connecting line between the oppositely situated electrical electrodes and the connecting lines leading to the electrodes. An external magnetic field can induce over the area an interference voltage which can distort the measurement voltage.

SUMMARY

A magnetic-inductive flow meter is disclosed comprising: a housing; and a measuring tube which is accommodated in the housing on which there are arranged a first electrode and, opposite thereto, a second electrode, electrode leads of the first and second electrodes being guided to outside the housing through a common leadthrough in the housing, the first and the second electrode leads being jointly twisted starting from the leadthrough as far as the first electrode, where the first electrode lead is electrically connected to the first electrode, and the second electrode is connected to a short-circuited conductor loop which encompasses the measuring tube and is connected to the second electrode lead at a location of the first electrode.

BRIEF DESCRIPTION OF THE DRAWINGS

Other features and advantages will become apparent from the following description of exemplary embodiments when used in conjunction with the drawing wherein:

The sole FIGURE illustrates an exemplary magnetic-inductive flow meter and its elements which are essential to provide measurement transverse to a flow direction of the measuring medium in a sectional view.

DETAILED DESCRIPTION

The present disclosure relates to a magnetic-inductive flow meter having a measuring tube on which there is fitted a magnetic unit for generating a magnetic field, which is aligned substantially perpendicular to a flow direction of an electrically conductive measuring medium flowing through the measuring tube and whose measurement voltage induced in the measuring medium can be detected by at least two inserted measuring electrodes electrically insulated from the measuring tube.

A magnetic-inductive flow meter is disclosed whereby a coupling of interference voltages to the electrical electrodes can be largely avoided.

As disclosed herein, a magnetic-inductive flow meter can include a measuring tube which is encased by a housing on which there are arranged a first electrode and, opposite thereto, a second electrode, the electrode leads of which electrodes are guided to outside the housing through a common leadthrough in the housing.

According to an exemplary embodiment, the first and the second electrode leads are jointly twisted starting from the leadthrough as far as the first electrode, where the first electrode lead is electrically connected to the first electrode. The second electrode is connected to a short-circuited conductor loop which encompasses the measuring tube and is connected to the second electrode lead at the location of the first electrode.

Owing to the twisted and closely adjacent guidance of the first and second electrode leads over an entire length of the first electrode lead, the effective area enclosed by the electrode leads can be at a minimum and, moreover, abruptly inverted. Although the continuation of the second electrode lead as conductor loop defines a comparatively large area, the interference voltage induced thereover can be short-circuited by the conductor loop. As a result of the two measures, it is no longer possible to detect a coupling-in of interference voltages via the electrode leads by means of measurement.

Exemplary embodiments will now be explained in more detail with the aid of an exemplary illustrated embodiment. The FIGURE illustrates an exemplary magnetic-inductive flow meter and its elements which are essential to provide measurement transverse to a flow direction of the measuring medium, in a sectional view. The magnetic-inductive flow meter as illustrated essentially includes a measuring tube 1 which is accommodated in a housing 2. A first coil and a second coil 11 and 12 are arranged outside the measuring tube 1 and inside the housing 2 in such a way that the first coil 11 is situated opposite the second coil 12.

A set of electrodes includes a first electrode and a second electrode 21 and 22 arranged transverse to the coils 11 and 12 in such a way that the first electrode 21 is situated opposite the second electrode 22. A geometric connecting line of the coils 11 and 12 intersects a geometric connecting line on an axis of the electrodes 21 and 22 orthogonally on a longitudinal axis of the measuring tube 1.

The coils 11 and 12 and the electrodes 21 and 22 can be connected with the aid of connecting lines to a processing device which are jointly guided out through a leadthrough 3 in the housing 2, the connecting lines to the magnetic coils 11 and 12 not being specifically illustrated, for the purpose of clarity.

The electrodes 21 and 22 can be connected to the processing device with the aid of a first electrode lead and a second electrode lead 31 and 32. The second electrode lead 32 is illustrated by dashes for the purpose of better distinction.

Starting from the leadthrough 3, the first and the second electrode leads 31 and 32 can be jointly twisted inside the housing 2 as far as the first electrode 21, where the first electrode lead 31 is electrically connected to the first electrode 21. The second electrode 22 is connected to a short-circuited conductor loop 32' which encompasses the measuring tube 1 and is connected to the second electrode lead 32 at the location of the first electrode 21. The conductor loop 32' is illustrated by dashes for the purpose of better distinction.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMERALS

1 Measuring tube
2 Housing
3 Leadthrough
11, 12 Coil
21, 22 Electrode
31, 32 Electrode lead
32' Conductor loop

What is claimed is:

1. A magnetic-inductive flow meter, comprising:
a housing; and
a measuring tube which is accommodated in the housing on which there are arranged a first electrode and, opposite thereto, a second electrode, electrode leads of the first and second electrodes being guided to outside the housing through a common leadthrough in the housing, the first and the second electrode leads being jointly twisted starting from the leadthrough as far as the first electrode, where the first electrode lead is electrically connected to the first electrode, and the second electrode is connected to a short-circuited conductor loop which encompasses the measuring tube and is connected to the second electrode lead at a location of the first electrode.

2. The magnetic-inductive flow meter according to claim 1, comprising:
a first coil and a second coil located outside the measuring tube and within the housing.

3. The magnetic-inductive flow meter according to claim 2, comprising:
connecting lines connected with the first and second coils, and being guided through the common leadthrough.

4. The magnetic-inductive flow meter according to claim 2, wherein the first and second electrodes are arranged such that a geometric line at an axis passing through the first and second electrodes is orthogonal to a geometric line of an axis passing through the first and second coils.

5. The magnetic-inductive flow meter according to claim 3, wherein the first and second electrodes are arranged such that a geometric line at an axis passing through the first and second electrodes is orthogonal to a geometric line of an axis passing through the first and second coils.

6. The magnetic-inductive flow meter according to claim 1, wherein the first and second electrode leads are twisted and closely adjacent over an entire length of the first electrode lead within the housing.

* * * * *